(12) United States Patent
Hamaoka

(10) Patent No.: US 11,191,341 B2
(45) Date of Patent: Dec. 7, 2021

(54) NOTIFICATION DEVICE, NOTIFICATION METHOD, AND STORAGE MEDIUM HAVING PROGRAM STORED THEREIN

(71) Applicant: CASIO COMPUTER CO., LTD., Tokyo (JP)

(72) Inventor: Natsumi Hamaoka, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 85 days.

(21) Appl. No.: 16/242,593

(22) Filed: Jan. 8, 2019

(65) Prior Publication Data

US 2019/0208894 A1 Jul. 11, 2019

(30) Foreign Application Priority Data

Jan. 11, 2018 (JP) .............................. JP2018-002653
Dec. 11, 2018 (JP) .............................. JP2018-231743

(51) Int. Cl.
*A45D 44/00* (2006.01)
*G06K 9/00* (2006.01)
(Continued)

(52) U.S. Cl.
CPC ........... *A45D 44/005* (2013.01); *A45D 42/00* (2013.01); *A45D 44/04* (2013.01); *G06F 9/542* (2013.01);
(Continued)

(58) Field of Classification Search
CPC ...... A45D 44/005; A45D 42/00; A45D 44/04; G06F 9/542; G06K 9/00255
(Continued)

(56) References Cited

U.S. PATENT DOCUMENTS 9,761,013 B2 9/2017 Nojima
10,660,425 B2 5/2020 Yamanashi et al.
(Continued)

FOREIGN PATENT DOCUMENTS

CN 103888643 A 6/2014
CN 105101836 A 11/2015
(Continued)

OTHER PUBLICATIONS

Chinese Office Action (and English language translation thereof) dated May 25, 2021, issued in counterpart Chinese Application No. 201910025846.3.

*Primary Examiner* — Michael R Neff
(74) *Attorney, Agent, or Firm* — Holtz, Holtz & Volek PC

(57) ABSTRACT

A change in a state of a user is more properly recognized by the user. A notification device includes a physical condition information acquiring section or a makeup information acquiring section, a light emitting section and a display section serving as a notifying section, a control section, and a determining section. The physical condition information acquiring section or the makeup information acquiring section acquires face information. The light emitting section and the display section serving as the notifying section perform a notification on the basis of the face information. The determining section determines a change between the face information before the notification and the face information after the notification. The control section controls the notification by the light emitting section and the display section serving as the notifying section on the basis of a determination result by the determining section.

11 Claims, 8 Drawing Sheets

(51) Int. Cl.
  *G06F 9/54* (2006.01)
  *A45D 44/04* (2006.01)
  *A45D 42/00* (2006.01)

(52) U.S. Cl.
  CPC .... *G06K 9/00255* (2013.01); *A45D 2044/007* (2013.01)

(58) Field of Classification Search
  USPC .......................................................... 382/100
  See application file for complete search history.

(56) References Cited

U.S. PATENT DOCUMENTS

| | | | | |
|---|---|---|---|---|
| 2016/0000209 | A1* | 1/2016 | Yamanashi | G06K 9/00255 |
| | | | | 434/100 |
| 2016/0357578 | A1* | 12/2016 | Kim | A45D 44/005 |
| 2017/0206691 | A1* | 7/2017 | Harrises | G02B 27/0172 |
| 2017/0311864 | A1 | 11/2017 | Manabe et al. | |
| 2018/0060650 | A1* | 3/2018 | de Paula | A61B 5/165 |
| 2019/0191850 | A1* | 6/2019 | Yoganandan | G06T 19/006 |
| 2020/0336705 | A1* | 10/2020 | Mouizina | H05B 45/20 |

FOREIGN PATENT DOCUMENTS

| | | |
|---|---|---|
| JP | 2005065812 A | 3/2005 |
| JP | 2013182062 A | 9/2013 |
| JP | 2014166218 A | 9/2014 |
| JP | 2016147006 A | 8/2016 |

* cited by examiner

NOTIFICATION DEVICE, NOTIFICATION METHOD, AND STORAGE MEDIUM HAVING PROGRAM STORED THEREIN

CROSS-REFERENCE TO RELATED APPLICATIONS

This application is based upon and claims the benefit of priority under 35 USC 119 of Japanese Patent Application No. 2018-002653 filed on Jan. 11, 2018 and Japanese Patent Application No. 2018-231743 filed on Dec. 11, 2018, the entire disclosure of which, including the description, claims, drawings, and abstract, is incorporated herein by reference in its entirety.

BACKGROUND OF THE INVENTION

1. Field of the Invention

The present invention relates to a notification device, a notification method, and a storage medium having a program stored therein.

2. Description of the Related Art

In recent years, there are techniques of acquiring information indicating a state of a user (for example, a state related to a physical condition or a state related to makeup) and using the acquired information variously.

For example, a configuration of acquiring information of a face of a user and giving a notification based on the acquired information of the face to the user is disclosed in JP 2014-166218 A.

BRIEF SUMMARY OF THE INVENTION

One aspect of the present invention is a notification device comprising: a memory; and a processor, wherein the processor executes a program stored in the memory to perform operations comprising: acquiring face information; performing a notification on the basis of the face information; determining a change between the face information before the notification and the face information after the notification; and controlling the notification on the basis of a determination result.

DETAILED DESCRIPTION OF THE INVENTION

Embodiments of the present invention will be explained with reference to the drawings.

Hereinafter, an embodiment of the present invention will be described with reference to the appended drawings.

A notification device 1 according to an embodiment of the present invention is configured as a self-standing mirror which can be carried by a user.

Further, the notification device 1 acquires physical condition information of a user facing a mirror.

Further, the notification device 1 controls a notifying means such that a notification of assistance information for causing the physical condition information to be improved is given.

Further, the notification device 1 determines whether or not the physical condition information has been improved after the notification of the assistance information.

According to the notification device 1, the user can understand a method for improving the physical condition information in accordance with the assistance information.

Further, the notification device 1 can perform an arbitrary process after determining whether or not the physical condition of the user understanding the method for improving the physical condition information has been improved.

In other words, according to the notification device 1, it is possible to cause the user to properly recognize the physical condition information of the user.

[External Configuration]

Figure 1:
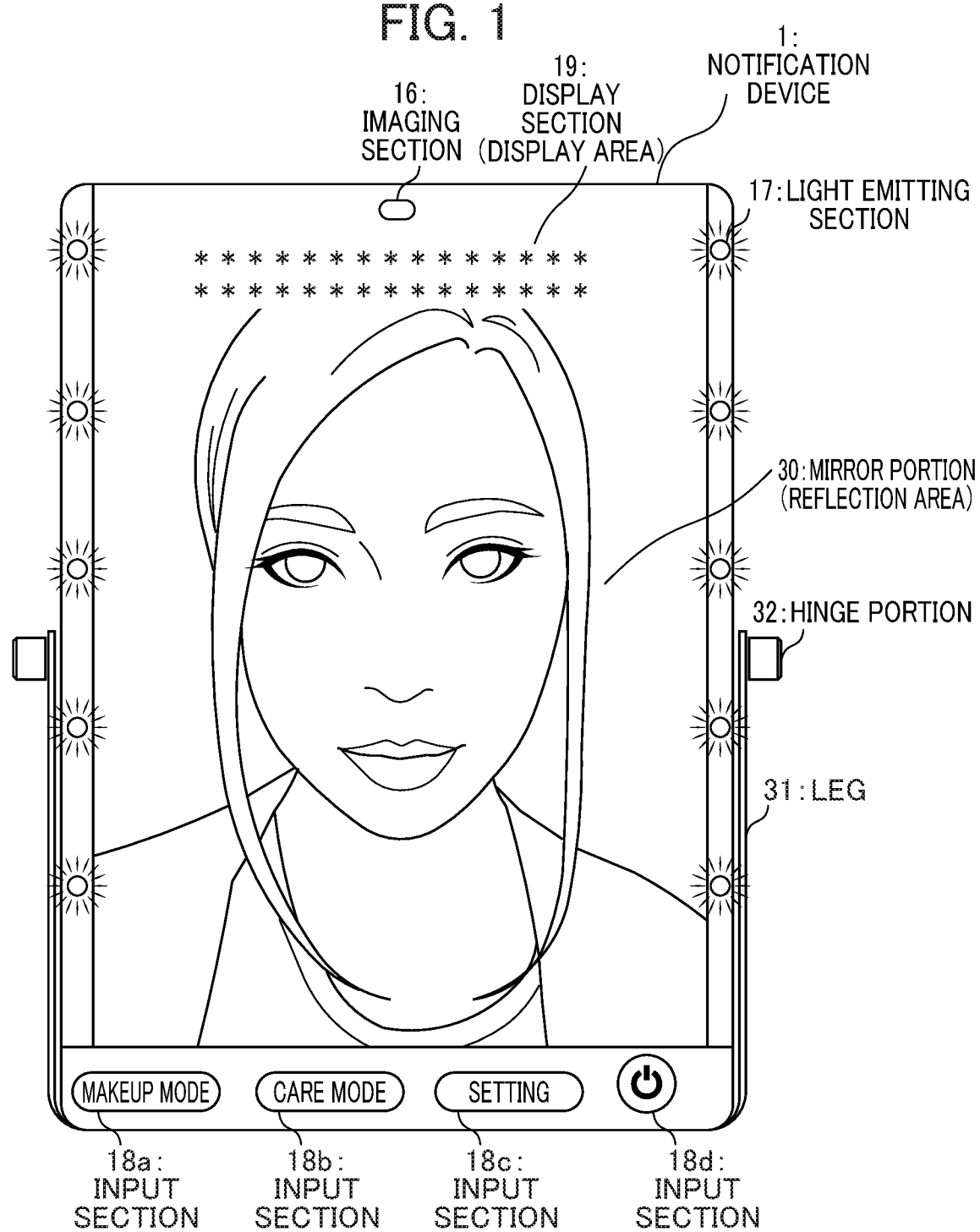
FIG. 1 is a configuration diagram illustrating an external configuration of a front surface of a notification device according to an embodiment of the present invention.

FIG. 1 is a configuration diagram illustrating an external configuration of a front surface of the notification device 1 according to an embodiment of the present invention.

Figure 2:
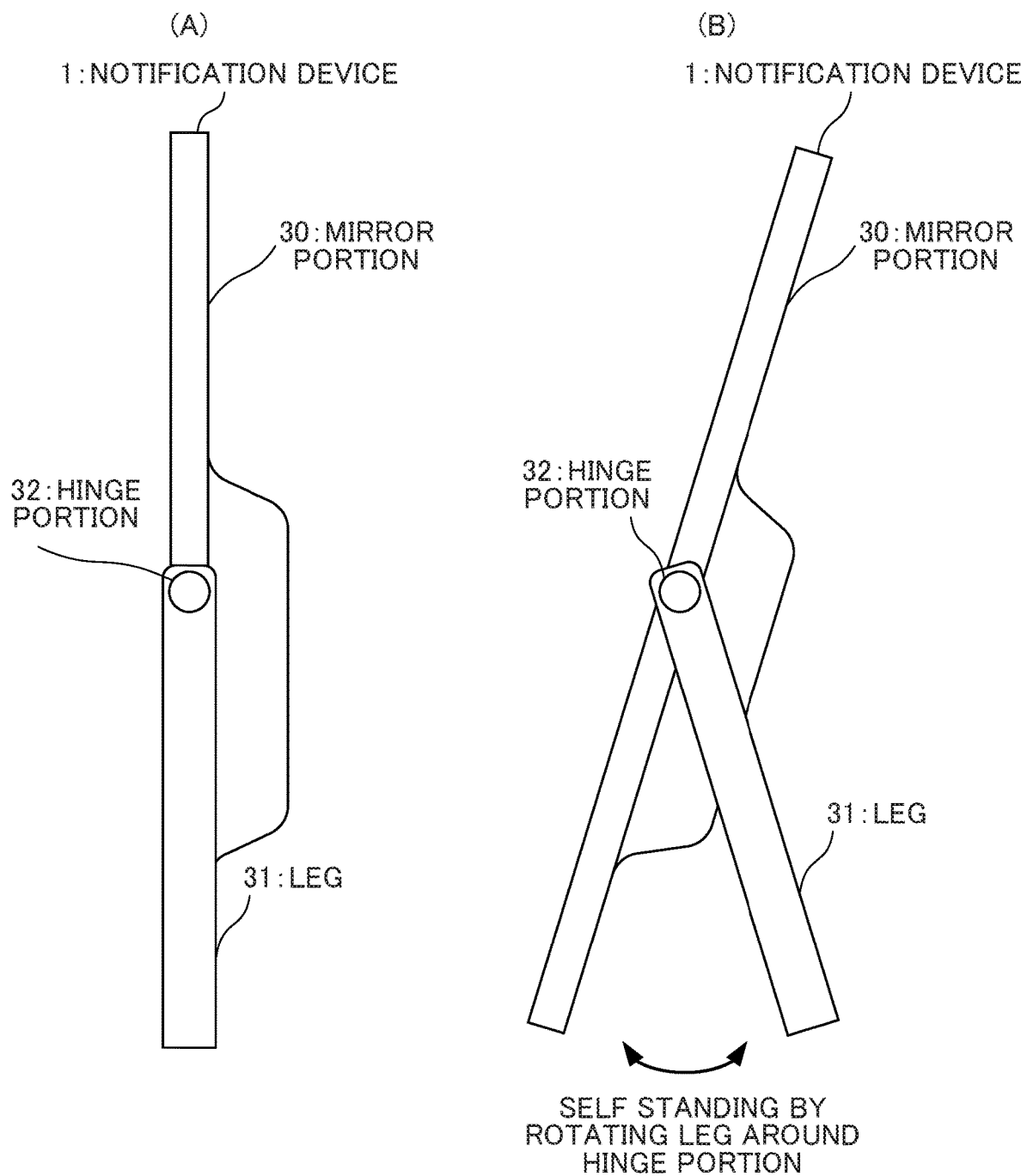
FIG. 2 is configuration diagrams illustrating an external configuration of a side surface of a notification device.

Further, FIG. 2 is a configuration diagram illustrating an external configuration of a side surface of the notification device 1.

The front surface of the notification device 1 is, for example, formed with an A4 size specified in International Organization for Standardization (ISO) 216.

As illustrated in FIGS. 1 and 2, the notification device 1 includes a mirror portion 30 and a leg 31.

The mirror portion 30 is a mirror having a reflecting surface.

The leg 31 and a hinge portion 32 are mechanisms for causes the notification device 1 to self-stand.

The leg 31 is pivotally joined to the mirror portion 30 by the hinge portion 32.

As illustrated in FIG. 2(A), when the notification device 1 is carried, the side surface of the mirror portion 30 and the side surface of the leg 31 are aligned, so that the user can carry the notification device 1 in a non-bulky shape.

On the other hand, as illustrated in FIG. 2(B), when the notification device 1 is installed and used on a desk or the like, the user can cause the notification device 1 to self-stand by causing the leg 31 to turn around the hinge portion 32.

In order to cause the notification device 1 to be able to self-stand, the hinge portion 32 has a structure for holding the leg 31 in a state in which a predetermined angle is maintained.

As illustrated in FIG. 1, the notification device 1 further includes an imaging section 16, a light emitting section 17, an input section 18, and a display section 19.

The imaging section 16 is a section that images the user facing the mirror portion 30 as a subject when the notification device 1 is used.

The imaging section 16 is placed at a position at which a facial image of the user facing the mirror portion 30 can be captured.

The light emitting section 17 is a section that emits light to illuminate the user facing the mirror portion 30.

As the user is illuminated by the light emitting section 17, the notification device 1 functions as a mirror with illumination lamps (also referred to as an "actress mirror"). Further, the light emitting section 17 performs a notification as a notifying section in a physical condition notification process to be described later.

The light emitting sections 17 are arranged at a plurality of positions on both ends of the mirror portion 30 respectively.

Here, for the sake of convenience of illustration, in FIG. 1, only one light emitting section 17 is denoted by a reference numeral, and the other light emitting sections 17 are not denoted by reference numerals.

The input section 18 is a section which receives a manipulation input by the user.

In FIG. 1, an input section 18a, an input section 18b, an input section 18c, and an input section 18d are illustrated as the input section 18 corresponding to manipulation content.

Here, the input section 18a receives a manipulation for performing switching to a makeup mode.

The input section 18b receives a manipulation for performing switching to a care mode.

Further, the input section 18c receives a manipulation for performing switching to a setting mode for performing various types of settings.

Further, the input section 18d receives a manipulation for performing on/off switching of a power supply of the notification device 1.

The display section 19 is a section which performs a notification as a notifying section in the physical condition notification process to be described later.

The display section 19 displays a message such as characters, an image, or the like.

Further, the display section 19 may display a facial image of the user facing the mirror portion 30 captured by the imaging section 16.

In the notification device 1, the reflecting surface of the reflecting portion constituting the mirror portion 30 and the display surface of the display section 19 are arranged superimposed in a viewing direction of the user facing the mirror portion 30 so that they are visible at the same time from the user.

For example, the display section 19 constituted by a liquid crystal display is arranged to overlap in parallel on a deep side of the mirror portion 30 constituted by a half mirror in the viewing direction.

With such an arrangement, the user can view his/her face reflected by the mirror portion 30 and information displayed on the display section 19 at the same time.

In the example of FIG. 1, a display area of the display section 19 is formed an upper portion of a screen, and a reflection area of the mirror portion 30 is formed a lower portion of the screen.

The external structure of the notification device 1 has been described above.

Here, this structure is merely an example, and an external structure of the notification device 1 is not limited to this example.

For example, the imaging section 16 may be arranged above the mirror portion 30 as illustrated in FIG. 1 but may also be arranged below the mirror portion 30, for example.

Further, similarly to the display section 19, the imaging section 16 may be arranged to overlap in parallel on the deep side of the mirror portion 30 constituted by the half mirror in the viewing direction.

Further, for example, the light emitting section 17 may be arranged in the upper or lower portion of the mirror portion 30 or may be arranged on the entire periphery of the mirror portion 30.

Further, for example, the number of input sections 18 or the arrangement of the input sections 18 may be changed.

Further, for example, a part of the display section 19 may be configured as a touch panel, and the input section 18 and the display section 19 may be integrally configured.

Further, for example, the display area realized by the display section 19 may be arranged in the upper portion of the screen but may be arranged at any other position.

For example, the display area may be arranged on the periphery of the central portion of the mirror portion 30 while assuming that the face of the user is reflected on the central portion of the mirror portion 30.

Further, for example, the mirror portion 30 may be arranged on a portion of the front surface of the notification device 1, and the display section 19 may be arranged on another portion of the front surface.

In other words, the mirror portion 30 and the display section 19 need not be necessarily arranged to overlap each other.

[Hardware Configuration]

Figure 3:
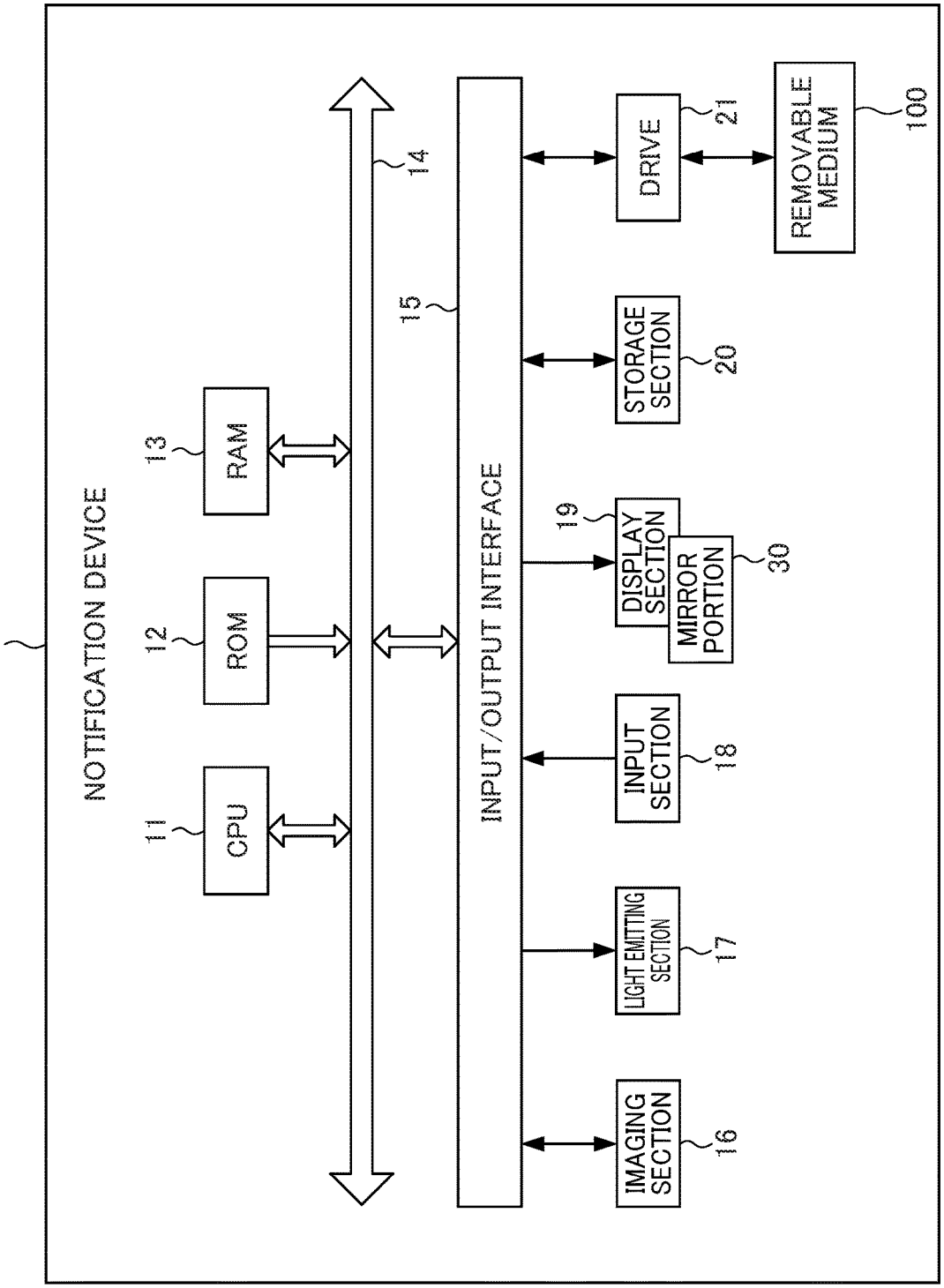
FIG. 3 is a block diagram illustrating a hardware configuration of a notification device.

FIG. 3 is a block diagram illustrating a hardware configuration of the notification device 1.

As illustrated in FIG. 3, the notification device 1 includes a central processing unit (CPU) 11, a read only memory (ROM) 12, a random access memory (RAM) 13, a bus 14, an input/output interface 15, an imaging section 16, a light emitting section 17, an input section 18, a display section 19, a storage section 20, and a drive 21.

The CPU 11 executes various processings according to a program recorded in the ROM 12, or a program loaded in the RAM 13 from the storage section 20.

Data or the like necessary for the CPU 11 to execute various processings, is also suitably stored in the RAM 13.

The CPU 11, the ROM 12, and the RAM 13 are connected to each other through the bus 14. In addition, the input/output interface 15 is also connected to the bus 14. The imaging section 16, the light emitting section 17, the input section 18, the display section 19, the storage section 20, and the drive 21 are connected to the input/output interface 15.

Although not illustrated, the imaging section 216 includes an optical lens unit and an image sensor.

The optical lens unit includes a lens such as, for example, a focus lens, a zoom lens, or the like that collects light in order to photograph a subject.

The focus lens is a lens that forms a subject image on a light receiving surface of the image sensor. The zoom lens is a lens that causes a focal length to be freely changed within a certain range.

Further, a peripheral circuit for adjusting setting parameters such as focus, exposure, white balance, and the like is installed in the imaging section 216 if necessary.

The image sensor is configured of a photoelectric conversion element, an analog front end (AFE), or the like.

The photoelectric conversion element, for example, is configured of a complementary metal oxide semiconductor (CMOS) type photoelectric conversion element or the like. The subject image is incident on the photoelectric conversion element from the optical lens unit. Then, the photoelectric conversion element performs photoelectric conversion (imaging) with respect to the subject image, accumulates an image signal for a constant time, and sequentially supplies the accumulated image signals to the AFE, as an analog signal.

The AFE executes various signal processings such as analog/digital (A/D) conversion processing, with respect to the analog image signal. A digital signal is generated by the various signal processings, and is output as an output signal from the imaging section 216.

The light emitting section 17 includes light emitters such as light emitting diodes (LEDs) corresponding to respective colors in an RGB color model and a control circuit capable of adjusting a color component in light emission of the light emitters on the basis of the RGB color model.

The light emitting section 17 illuminates the user by adjusting the color components of RGB to a predetermined state and emitting light together with activation of the notification device 1.

The predetermined state is a state in which the face of the user reflected on the mirror portion 30 looks naturally.

Further, for example, the light emitting section 17 emits light while reducing the R component by suppressing the light emission of the light emitter corresponding to R on the basis of an instruction from the CPU 11.

The input section 18 includes various types of buttons or the like, and inputs various types of information in accordance with an instruction manipulation of the user.

The display section 19 includes a liquid crystal display or the like, and displays an image corresponding to image data output from the CPU 11.

The mirror portion 30 includes a half mirror and, for example, reflects the face of the user.

The arrangement of the display section 19 and the mirror portion 30 is performed as described above with reference to FIG. 1.

The storage section 20 includes a semiconductor memory such as a dynamic random access memory (DRAM) and stores various types of data.

A removable medium 100 constituted by a magnetic disk, an optical disk, a magneto-optical disk, a semiconductor memory or the like is properly loaded onto the drive 21.

The removable medium 100 stores a program for executing the physical condition notification process to be described later or various types of data such as image data.

The program or various types of data such as image data read from the removable medium 100 by the drive 21 is installed in the storage section 20 if necessary.

The notification device 1 may further include other functional blocks in addition to the above-described functional blocks.

For example, the notification device 1 includes a lamp, a speaker, a vibration motor, or the like, and may include an output section that outputs light, a sound, or a vibration signal.

Further, for example, the notification device 1 may have a communication section, or the like for performing communication with another device (not illustrated) via a network including the Internet.

[Functional Configuration]

Figure 4:
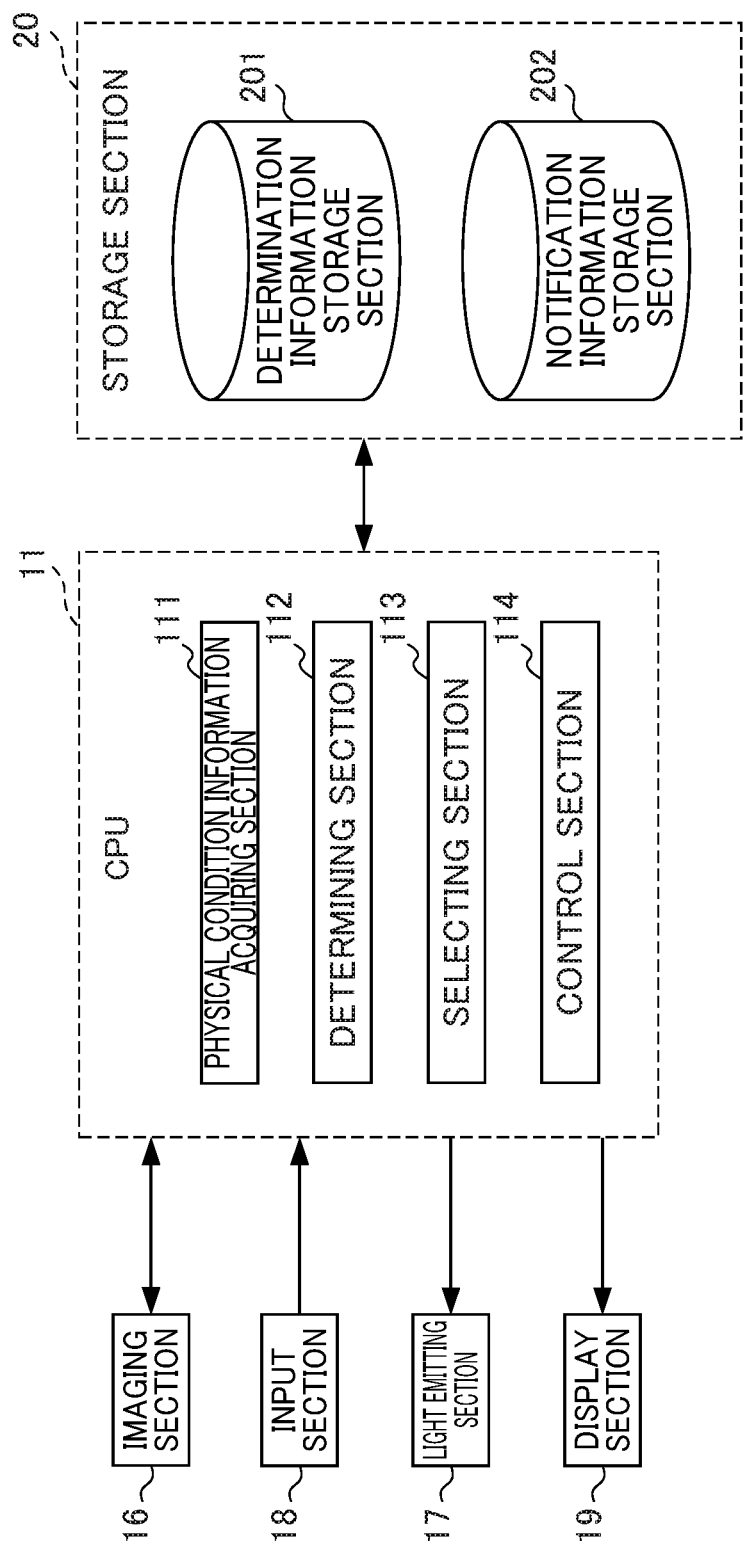
FIG. 4 is a functional block diagram illustrating a functional configuration for executing a physical condition notification process in a functional configuration of a notification device.

FIG. 4 is a functional block diagram illustrating a functional configuration for executing the physical condition notification process in the functional configuration of the notification device 1.

The physical condition notification process includes a series of processes in which the notification device 1 performs a notification on the basis of the physical condition information.

In a case in which the physical condition notification process is executed, the CPU 11 functions as a physical condition information acquiring section 111, a determining section 112, a selecting section 113, and a control section 114 as illustrated in FIG. 4.

A determination information storage section 201 and a notification information storage section 202 are set in an area of the storage section 20.

Information by which the determining section 112 performs determination of the physical condition information is stored in the determination information storage section 201.

Specifically, the physical condition information of the user acquired in the physical condition notification process or the physical condition information used as a criterion of the determination is stored.

Information by which the light emitting section 17 or the display section 19 performs a notification under the control of the control section 114 is stored in the notification information storage section 202.

More specifically, control information for controlling light emission of the light emitting section 17 or character data (text data) or image data to be displayed on the display section 19 is stored.

In the following description, both light emitting section 17 and the display section 19 are referred to properly as a "notifying section."

Further, various types of data such as the physical condition information and the notification information stored in the determination information storage section 201 and the notification information storage section 202 may be stored only in the storage section 20 but may be properly read from a removable medium 100 by the drive 21.

The physical condition information acquiring section 111 is a section that acquires the physical condition information which is information indicating the physical condition of the user.

In the present embodiment, the physical condition information acquiring section 111 analyzes the image captured by the imaging section 16 and acquires an analysis result as the physical condition information.

Here, as described above with reference to FIG. 1, the imaging section 16 is arranged at a position at which the face of the user facing the mirror portion 30 is imaged.

Therefore, this image captured by the imaging section 16 includes the image of the face part of the user.

The physical condition information acquiring section 111 first analyzes the image and identifies an area corresponding to the face part of the user in the image.

For example, the physical condition information acquiring section 111 extracts a contour of the face of the user in the image or extracts a feature quantity such as the eyes, and specifies an area corresponding to the face part of the user. Then, the physical condition information acquiring section 111 analyzes a color of each pixel of the specified area corresponding to the face part of the user.

For example, RGB values are calculated for each pixel, and a value of R of each pixel is integrated and used as the physical condition information of the user.

In other words, in the present embodiment, redness of the face of the user is used as the physical condition information indicating the physical condition or a mental state of the user.

This is because a reddish face is generally regarded as a face which looks less tired and has a healthier complexion than a pale face.

Further, weighting may be performed when the value of R of each pixel is integrated.

For example, when the area corresponding to the face part of the user is specified, an area of a cheek or a lip which redness is likely to be obtained as a feature is further specified.

The value of R of the area of the cheek or the lip which redness is likely to be obtained as a feature may be integrated by weighting more than the values of R of other areas.

The physical condition information acquiring section 111 acquires the physical condition information (hereinafter, this physical condition information is referred to as "first physical condition information") by analyzing as described above at the start of the physical condition notification process.

Then, if a predetermined period of time elapses, the physical condition information acquiring section 111 acquires the physical condition information (hereinafter, this physical condition information is referred to as "second physical condition information") again by analyzing as described above.

Then, the physical condition information acquiring section 111 stores each piece of physical condition information acquired by analyzing as described above in the determination information storage section 201 as determination information.

Further, the physical condition information acquiring section 111 stores an average value of the history of the physical condition information acquired in the past in the determination information storage section 201 as the physical condition information used as the reference (hereinafter referred to as "reference physical condition information").

The determining section 112 is a section that performs determination on the basis of the determination information stored in the determination information storage section 201.

At this point, as described above, in the present embodiment, the value of R corresponding to redness on the face of the user is used as the physical condition information.

Therefore, the determining section 112 performs determination on the basis of the value of R corresponding to redness on the face of the user.

The determining section 112 first compares the first physical condition information with the reference physical condition information and determines whether or not the physical condition information of the user at the start of the physical condition notification process is better than the reference on the basis of the comparison result.

Specifically, the determining section 112 compares the first physical condition information and the reference physical condition information, and determines that the physical condition of the user at the start of the physical condition notification process is good in a case in which the value of R in the first physical condition information is higher than that in the reference physical condition information.

Although the value of R is used for comparing the first physical condition information with the reference physical condition information, the present invention is not limited thereto, and comparison may be performed using as at least one or more parameters among RGB, or comparison may be performed using image analysis or biometric information obtained from a biosensor.

Further, the determining section 112 compares the first physical condition information with the second physical condition information, and determines whether or not the physical condition information has been improved on the basis of the comparison result.

Specifically, the determining section 112 compares the first physical condition information with the second physical condition information, and determines that the physical condition information of the user has been improved by performing the physical condition notification process in a case in which the R value of the second physical condition information has been increased to be larger than the value of R of the first physical condition information by a predetermined value or more.

Although the value of R is used for comparing the first physical condition information with the second physical condition information, the present invention is not limited thereto, and comparison may be performed using as at least one or more parameters among RGB, or comparison may be performed using image analysis or biometric information obtained from a biosensor.

The determining section 112 outputs a determination result obtained by such determination to the control section 114 which is described later.

The selecting section 113 is a section that selects the notifying section to be used for the notification in the physical condition notification process.

The selecting section 113 selects an appropriate notifying section in accordance with content of a notification or the like decided on the basis of the physical condition information.

The control section 114 is a section which executes a notification by controlling the notifying section selected by the selecting section 113 on the basis of the determination result of the determining section 112.

Specific content of the notification executed in cooperation of these units will be described in detail in the following description of [Operation].

[Operation]

Next, an operation of the notification device 1 will be described.

Figure 5:
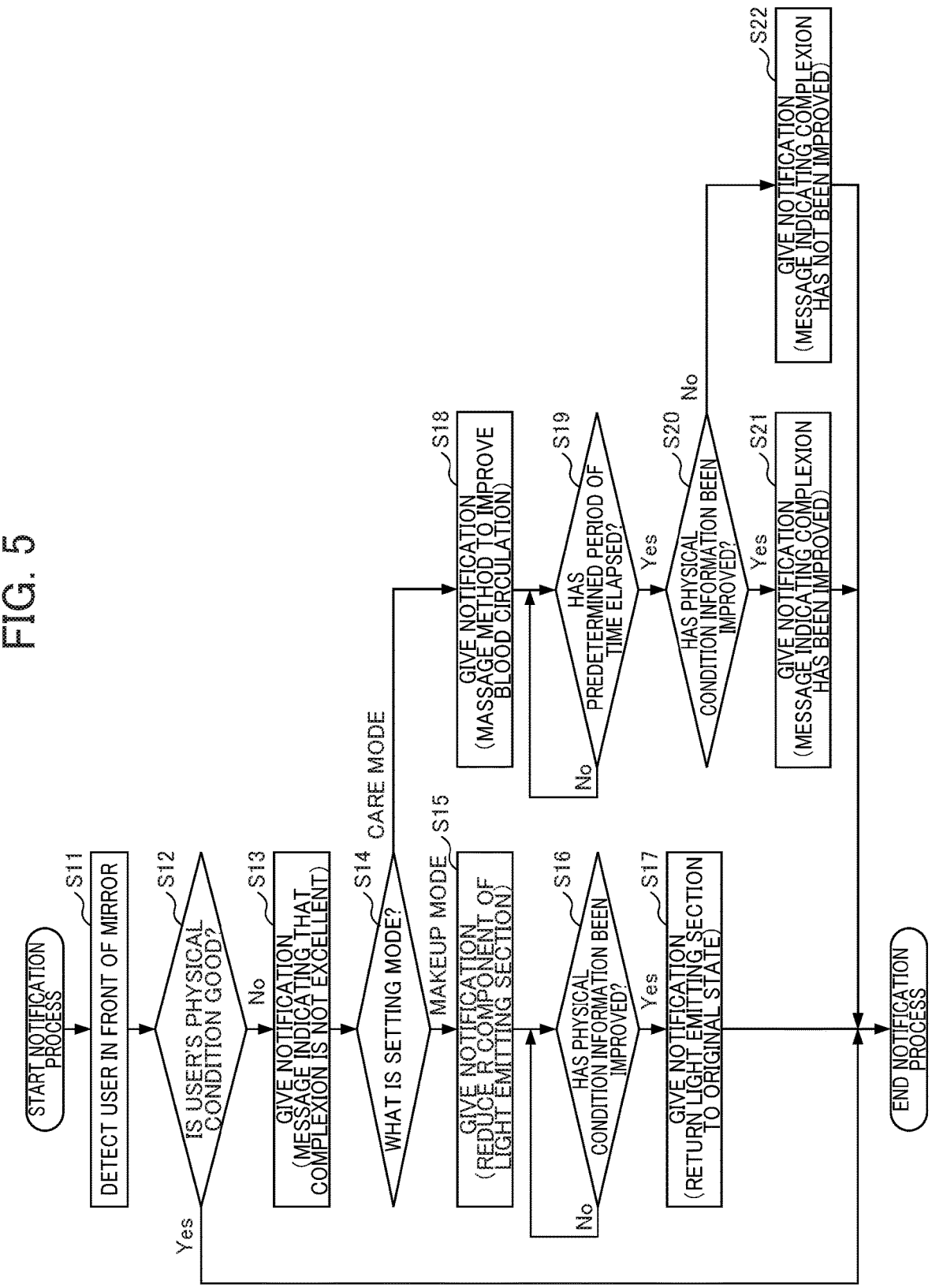
FIG. 5 is a flowchart illustrating a flow of a physical condition notification process executed by a notification device.

FIG. 5 is a flowchart for describing a flow of the physical condition notification process executed by the notification device 1.

Figure 6:
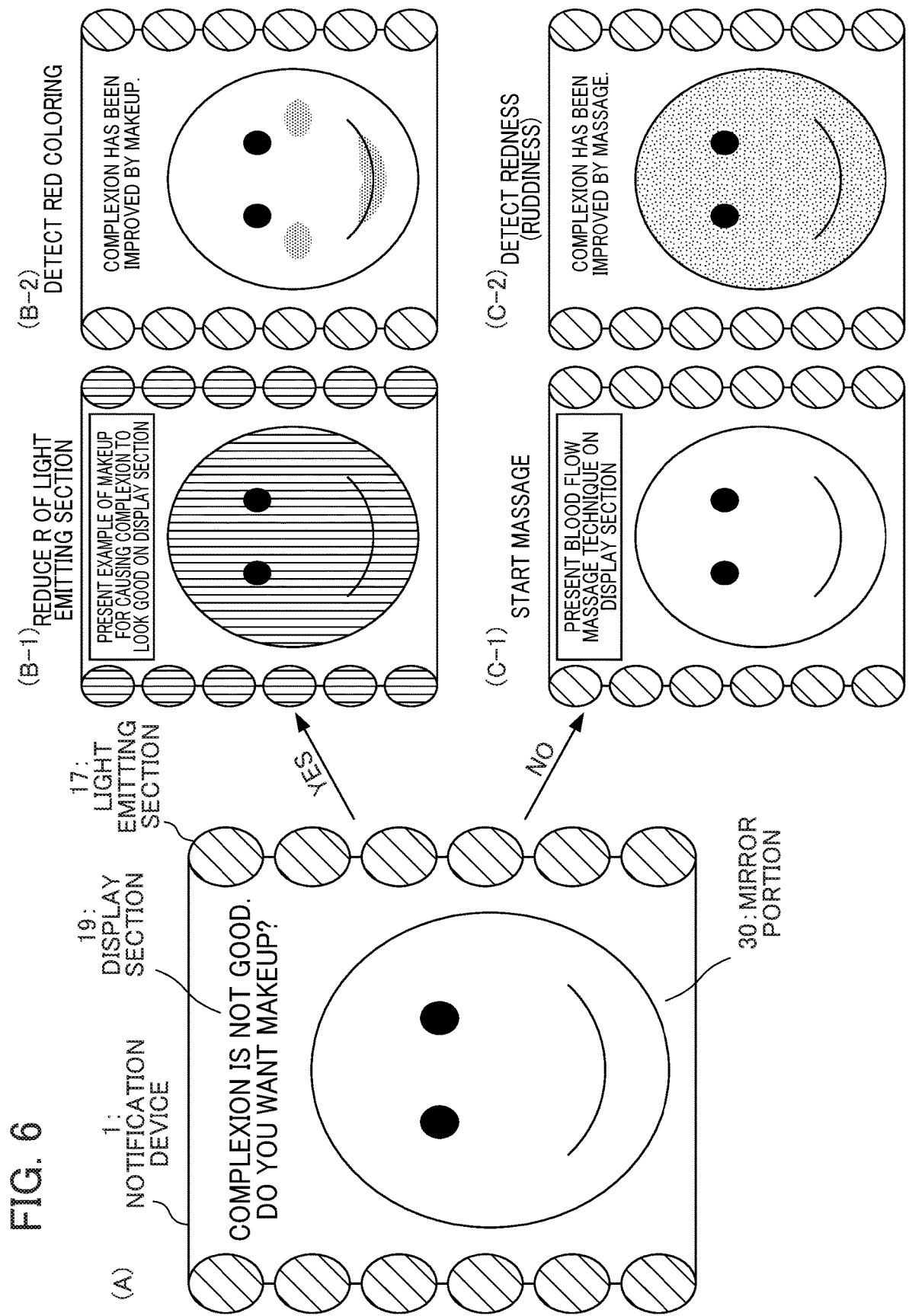
FIG. 6 is image diagrams for describing transition of a mirror portion and a notifying section when a physical condition notification process is executed by a notification device.

FIG. 6 is an image diagrams illustrating transition of the mirror portion 30 and the notifying section (namely, the light emitting section 17 and the display section 19) in the physical condition notification process.

The physical condition notification process starts with the activation of the notification device 1.

In step S11, the physical condition information acquiring section 111 analyzes the image captured by the imaging section 16, and acquires the first physical condition information if the user is detected in front of the mirror portion 30.

In step S12, the determining section 112 compares the first physical condition information acquired in step S11 with the reference physical condition information stored in the determination information storage section 201, and determines whether or not the physical condition of the user at the start of the physical condition notification process is good.

In a case in which the physical condition of the user is good, Yes is determined in step S12, and the process ends.

In other words, since the physical condition of the user is good, the process ends without performing a notification particularly.

In this case, the notification device 1 functions as a mirror with illumination lamps by the light emitting section 17 emitting light and the mirror portion 30 reflecting the user. On the other hand, if it is determined that the physical condition of the user is not good, No is determined in step S12, and the process proceeds to step S13.

In step S13, the selecting section 113 and the control section 114 give a notification to the user in cooperation with each other.

In this notification, for example, the selecting section 113 selects the display section 19 as the notifying section.

Then, the control section 114 gives a notification to the user by causing a message such as, for example, "complexion is not excellent" or "look tired," using characters or illustrations to be displayed on the display section 19.

In this case, as a message prompting a setting to the makeup mode to be described later, for example, a message such as "do you want makeup?" may be further displayed on the display section 19.

FIG. 6(A) illustrates the states of the mirror portion 30 and the notifying section (that is, the light emitting section 17 and the display section 19) in a case in which a notification is performed in step S13.

In this case, the light emitting section 17 adjusts the color components of RGB to a predetermined state and emits light together with the activation of the notification device 1.

Further, the face of the user illuminated by the light emission adjusted to the predetermined state is reflected on the mirror portion 30.

Further, the display section 19 displays the message described above.

By receiving such a notification, the user can notice that his/her physical condition is not good.

In step S14, the control section 114 determines a mode which is currently set.

Here, in the present embodiment, there are two modes, that is, the "makeup mode" and the "care mode."

Then, the control section 114 sets one of the modes on the basis of a manipulation of the user by the input section 18a or the input section 18b illustrated in FIG. 1.

The setting based on the manipulation of the user may be performed in advance before the physical condition notification process or may be performed during the physical condition notification process.

For example, the mode may be set in accordance with a manipulation performed by the user who has received the notification in step S13.

In a case in which the user selects the makeup mode, and the makeup mode is set, in step S14, it is determined to be the "makeup mode," and the process proceeds to step S15.

On the other hand, in a case in which the user selects the care mode, and the care mode is set, in step S14, it is determined to be "care mode," and the process proceeds to step S18.

In a case in which the makeup mode is selected, in step S15, the selecting section 113 and the control section 114 give a notification to the user in cooperation with each other.

In this notification, for example, the selecting section 113 selects the light emitting section 17 as the notifying section. The control section 114 controls the light emitting section 17 such that the R component of the light emitting section 17 is intentionally suppressed.

Accordingly, it is emphasized that the face of the user is short of redness, and a complexion is bad.

In other words, the control section 114 further emphasizes the physical condition information acquired by the physical condition information acquiring section 111.

Further, for the user, the physical condition information which is the redness of the face reflected in the mirror portion 30 is further emphasized.

Further, the selecting section 113 selects the display section 19 as the notifying section.

Then, the control section 114 give a notification to the user, for example, by causing a makeup sample image and a color sample used by a sample to be displayed on the display section 19.

FIG. 6(B-1) illustrates the states of the mirror portion 30 and the notifying section (that is, the light emitting section 17 and the display section 19) in a case in which a notification is performed in step S15.

In this case, the light emitting section 17 performs light emission in which the R component is intentionally suppressed.

Further, the face of the user illuminated by the light emission suppressing the R component is reflected on the mirror portion 30.

Further, a makeup sample image and a color sample used by a sample are displayed on the display section 19.

By receiving such a notification, the user can make an appropriate makeup.

Particularly, since it is emphasized that the complexion is bad, the user can perform a makeup of compensating for this.

In step S16, the determining section 112 compares the first physical condition information with the second physical condition information, and determines whether or not the physical condition information has been improved on the basis of the comparison result.

The second physical condition information is the physical condition information of the user whose face is colored to be reddish by applying a cosmetic product (such as a red lipstick or cheek) of a red powder or the like on the face of the user in the makeup performed by the user after the notification in step S15.

In a case in which the value of R of the second physical condition information has not been increased to be larger than the value of R of the first physical condition information by a predetermined value or more, since the physical condition information has not been improved, No is determined in step S16, and step S16 is repeated.

This indicates that the makeup by the user is still insufficient.

On the other hand, in a case in which the value of R of the second physical condition information has been increased to be larger than the value of R of the first physical condition information by a predetermined value or more, since the physical condition information has been improved, Yes is determined in step S16, and the process proceeds to step S17.

This indicates that the makeup by the user has been performed properly.

In step S17, the selecting section 113 and the control section 114 give a notification to the user in cooperation with each other.

In this notification, for example, the selecting section 113 selects the light emitting section 17 as the notifying section.

Then, the control section 114 controls the light emitting section 17 such that the light emission state of the light emitting section 17 is returned to a predetermined state similar to that at the time of the activation of the notification device 1.

This predetermined state is a state in which the face of the user reflected on the mirror portion 30 looks naturally as described above.

Further, the selecting section 113 selects the display section 19 as the notifying section.

Then, the control section 114 gives a notification to the user by causing a message such as, for example, "complexion has been improved by makeup," using characters or illustrations to be display section 19.

FIG. 6(B-2) illustrates the states of the mirror portion 30 and the notifying section (that is, the light emitting section 17 and the display section 19) in a case in which a notification is performed in step S17.

In this case, the light emitting section 17 returns from the state in which the R component is suppressed intentionally to the state in which the face of the user reflected on the mirror portion 30 looks naturally.

Further, the display section 19 displays the message described above.

The user can understand that the complexion has been improved by checking the message.

Further, the user can check the face after the makeup in the state in which the face of user reflected on the mirror portion 30 looks naturally.

Accordingly, the physical condition notification process ends.

On the other hand, in a case in which the care mode is selected, in step S18, the selecting section 113 and the control section 114 give a notification to the user in cooperation with each other.

In this notification, for example, the selecting section 113 selects the display section 19 as the notifying section.

Then, the control section 114 gives a notification to the user by causing, for example, a massage method for improving blood circulation to be displayed on the display section 19.

FIG. 6(C-1) illustrates the states of the mirror portion 30 and the notifying section (that is, the light emitting section 17 and the display section 19) in a case in which a notification is performed in step S18.

In this case, the display section 19 displays a massage method for improving blood circulation.

By receiving such a notification, the user can perform a massage for improving blood circulation.

In step S19, the determining section 112 determines whether or not a predetermined period of time has elapsed since the notification is performed in step S18.

The predetermined period of time is assumed to be a period time sufficient for the blood circulation to be improved by the massage.

In a case in which the predetermined period of time does not elapse, No is determined in step S19, and the determination in step S19 is repeated.

On the other hand, in a case in which the predetermined period of time has elapsed, Yes is determined in step S19, and the process proceeds to step S20.

In step S20, the determining section 112 compares the first physical condition information with the second physical condition information, and determines whether or not the physical condition information has been improved on the basis of a comparison result.

The second physical condition information is the physical condition information of the user after the massage for improving the blood circulation is performed.

In a case in which the value of R of the second physical condition information has been increased to be larger than the value of R of the first physical condition information by a predetermined value or more, since the physical condition information has been improved, Yes is determined in step S20, and the process proceeds to step S21.

This indicates that as the massage for improving the blood circulation is performed by the user, the blood circulation is improved, and redness appears on the face.

In step S21, the selecting section 113 and the control section 114 give a notification to the user in cooperation with each other.

In this notification, for example, the selecting section 113 selects the display section 19 as the notifying section.

Then, the control section 114 gives a notification to the user by causing a message such as, "complexion has been improved by massage," using characters or illustrations to be displayed on the display section 19.

FIG. 6(C-2) illustrates the states of the mirror portion 30 and the notifying section (that is, the light emitting section 17 and the display section 19) in a case in which a notification is performed in step S21.

In this case, the display section 19 displays the message described above.

The user can understand that the complexion has been improved by checking the message.

Accordingly, the physical condition notification process ends.

On the other hand, if the value of R of the second physical condition information has not been increased to be larger than the value of R of the first physical condition information by the predetermined value or more, since the physical condition information has not improved, No is determined "in step S20, and the process proceeds to step S22.

This indicates that the blood circulation has been not improved, and redness does not appear on the face although the massage has been sufficiently performed.

At this point, in the case of the makeup mode, the physical condition information is considered to be finally improved (that is, the value of the R finally is increased by a predetermined value or more) by continuously performing the makeup, the determination is repeated until the physical condition information is improved as in step S16.

However, in the case of the care mode, if the physical condition information is not improved although the massage has been sufficiently performed, the user is currently in poor physical condition, and the physical condition information is considered not to be improved although the massage is continuously performed.

For this reason, the determination is not repeated as in step S16, and the process proceeds to step S22.

In step S22, the selecting section 113 and the control section 114 give a notification to the user in cooperation with each other.

In this notification, for example, the selecting section 113 selects the display section 19 as the notifying section.

Then, the control section 114 give a notification to the user by causing a message such as, for example, "massage was performed, but complexion has not been improved," using characters or illustrations to be displayed on the display section 19.

The user can understand that the complexion has not been improved by checking the message.

Therefore, the user can understand that there is a possibility that the user may be in a state such as anemia or gastric ulcer.

Further, receiving it at the hospital in accordance with this may be considered.

Accordingly, the physical condition notification process ends.

With the processing described above, the notification device 1 can notify the user of the assistance information for improving the acquired physical condition information.

Therefore, the user can understand the method for improving the physical condition information.

The notification device 1 configured as described above or a notification device 1 configured as in a modified example to be described below includes a physical condition information acquiring section 111 or a makeup information acquiring section 115, a light emitting section 17 and a display section 19 serving as a notifying section, a control section 114, and a determining section 112.

The physical condition information acquiring section 111 or the makeup information acquiring section 115 acquires face information.

The light emitting section 17 and the display section 19 serving as the notifying section perform a notification on the basis of the face information.

The determining section 112 determines a change between the face information before the notification and the face information after notification.

The control section 114 controls the notification by the light emitting section 17 and the display section 19 serving as the notifying section on the basis of a determination result by the determining section 112.

As a result, the notification device 1 can give a notification indicating the change in the user based on the acquired face information to the user.

Therefore, the user can understand a change in the user's own state (for example, a change in the physical condition information or a change in the makeup).

In other words, according to the notification device 1, it is possible to cause the user to more properly recognize the change in the state of the user.

The notification device 1 includes a plurality of light emitting sections 17 and a plurality of display sections 19 serving as the notifying section and further includes a selecting section 113.

The selecting section 113 selects a type of light emitting section 17 and display section 19 serving as the notifying section.

The control section 114 controls a notification by the light emitting section 17 and the display section 19 serving as the notifying section selected by the selecting section 113.

Accordingly, the notification device 1 can perform a notification through the selected notifying section.

Therefore, for example, the notification device 1 can perform a notification suitable for each mode set by the user.

The determining section 112 calculates a difference between the face information before the notification and the face information after the notification.

The control section 114 causes the light emitting section 17 and the display section 19 serving as the notifying section to notify of the difference calculated by the determining section 112.

Accordingly, the notification device 1 can notify the user of the difference of the face information which is information indicating the change of the user based on the acquired face information.

Therefore, the user can understand the difference of the face information which is information indicating the change of the user.

The control section 114 causes the light emitting section 17 and the display section 19 as the notifying section to give a notification so that the face information is emphasized.

Accordingly, the user can more properly understand the state of the user which is difficult to notice in a normal situation.

The control section 114 causes the light emitting section 17 and the display section 19 serving as the notifying sections to notify of information for encouraging a predetermined action corresponding to the face information.

Accordingly, the user can perform a predetermined action corresponding to the face information, and the physical condition can be improved accordingly, or the makeup can be performed properly.

The physical condition information acquiring section 111 or the makeup information acquiring section 115 acquires an image of a subject which is a face information acquisition target, and the determining section 112 determines the change between the face information before the notification and the face information after the notification on the basis of the image of the subject.

Accordingly, the notification device 1 can determine whether or not the physical condition information has been improved or whether or not the makeup has been performed properly, on the basis of the facial image of the user or the like.

For example, it is possible to perform determination on the basis of a change in complexion specified by analyzing the facial image.

The light emitting section 17 and the display section 19 serving as the notifying section perform a notification by light emission, and the control section 114 controls the light emission of the light emitting section 17 and the display section 19 serving as the notifying section on the basis of a determination result by the determining section 112.

Accordingly, the notification device 1 can perform a notification using the light emission.

For example, control is performed such that the R component among the RGB components is reduced in the light emission, so that a notification for emphasizing the complexion of the user can be performed.

The light emitting section 17 and the display section 19 serving as the notifying section perform a notification using characters, and the control section 114 controls characters which the light emitting section 17 and the display section 19 serving as the notifying section notify on the basis of a determination result by the determining section 112.

Accordingly, the notification device 1 can perform a notification with a message sentence or the like using characters.

The light emitting section 17 and the display section 19 serving as the notifying section perform a notification by characters, and the control section 114 controls a display position of the characters which the light emitting section 17 and the display section 19 serving as the notifying section notify on the basis of a determination result by the determining section 112.

Accordingly, the notification device 1 can give a notification after controlling the display position of the message sentence or the like using characters.

The notification device 1 includes the display section 19 or the mirror portion 30 for displaying a subject which is a face information acquisition target.

Accordingly, the notification device 1 can cause the user to visually recognize the user's face or the like by using an image display section such as a mirror or a display.

The display surface of the display section and the display surfaces of the light emitting section 17 and the display section 19 serving as the notifying section are arranged superimposed to be visible in the viewing direction.

Accordingly, the user can visually recognize his/her own face or the like reflected by the display section and the notified information at the same time.

The physical condition information acquiring section 111 or the makeup information acquiring section 115 acquires information related to the physical condition or information related to the makeup as the face information.

Accordingly, it is possible to determine a change related to the physical condition or a change related to the makeup before and after the notification.

Therefore, the notification based on the changes related to the physical condition or the changes related to the makeup can be performed.

The light emitting section 17 and the display section 19 serving as the notifying section notify of assistance information or evaluation information on the basis of the face information.

Accordingly, the user can receive a notification of the assistance information (for example, an advice for improving the physical condition) or the evaluation information (for example, an evaluation related to the makeup) on the basis of the face information of the user.

[Effects]

Next, effects of the above-described embodiment will be described.

As the assumption, for example, it is undesirable that persons seeking a job or persons dealing with customer services show tired faces or unhealthy faces to other persons in their situation.

In this regard, these persons cover tired faces or unhealthy faces by doing makeup or the like while checking their faces or the like reflected on the mirror at home or the like.

However, persons except makeup professionals or those who are taught makeup do not know how to cover tired faces.

Particularly, when the physical condition is poor or sleep is not enough, they have no enough room to think about "how can I cover?."

In the case of chronic fatigue in which daily fatigue has been accumulated continuously in work, housework, childcare, nursing care, or the like, many people do not notice that they have tired faces (bad complexion) and first notice it when other people point it out.

If they are doing something without noticing that fatigue appears on their faces, they get into a vicious circle in which job hunting or customer service or business talk do not go well in the first impression, and it finally leads to health problems or leads to sickness.

In this regard, the user can obtain the following effects by using the above-described embodiment.

In the case of the chronic fatigue, people hardly notice a bad complexion or a tired expression by themselves.

A shadow of the chronic fatigue sometimes indicates that a disease is latent.

However, according to the present embodiment, since it is possible to encourage the makeup or the massage to improve ruddiness, it is possible not only to improve the appearance but also to generate awareness in the user.

Further, persons seeking a job or persons dealing with customer services fail if they give an unhealthy impression in the first impression.

However, according to the present embodiment, since a mirror proposes a makeup for giving a healthy impression at that spot although tired faces are shown in front of a mirror above a washbasin when wake up, it is possible to perform a makeup for giving a good impression without panicking in a busy morning.

Further, according to the present embodiment, since the mirror lets them know the makeup method or the massage method, they can understand the makeup method or massage method without investigating.

Further, according to the present embodiment, in a case in which the bad complexion does not disappear although the massage is performed, it indicates that a disease is latent, and thus it is possible to notice a bad physical condition before it becomes a serious debases.

[Modified Examples]

The present invention is not limited to the above-described embodiment, and modification, improvements, or the like within the scope for achieving the object of the present invention are included in the present invention.

[Modified Example Using Previous Physical Condition Information]

For example, in the above-described embodiment, the determining section 112 performs the determination in step S16 or step S20 after the notification in step S13.

In this determination, the determining section 112 compares the first physical condition information with the second physical condition information, and determines whether or not the physical condition information has been improved on the basis of the comparison result.

As a modification thereof, the determining section 112 may compare the physical condition information acquired in the past in step S16 or step S20 after the notification in step S13 (hereinafter referred to as "previous physical condition information") with the second physical condition information. Here, the previous physical condition information is the physical condition information acquired by analyzing the image captured by the imaging section 16 through the physical condition information acquiring section 111 before the notification at step S13.

Specifically, for example, the physical condition information acquiring section 111 stores the first physical condition information or the second physical condition information acquired in a previous physical condition notification process in the determination information storage section 201.

Then, in the current physical condition notification process, the determining section 112 uses these first physical condition information or second physical condition information stored in the determination information storage section 201 as the previous physical condition information.

Accordingly, the determining section 112 can compare, for example, the physical condition information (previous physical condition information) of a previous day with the current physical condition information (the second physical condition information).

Further, in this comparison, it may be determined whether or not the physical condition information has been improved on the basis of the comparison result as in the above-described embodiment, but it may be determined whether or not there is a change or a degree of change.

In this case, for example, the determining section 112 performs determination by calculating the difference between the previous physical condition information and the second physical condition information.

The calculated difference is, for example, the difference in the value of R.

After this comparison ends, the selecting section 113 and the control section 114 may notify the user of a message indicating the difference in cooperation with each other instead of the notifications in step S17, step S21, and step S22.

In this notification, for example, the selecting section 113 selects the display section 19 as the notifying section.

Then, the control section 114 give a notification to the user by causing the message indicating the difference such as, for example, "complexion is not better than yesterday" or "complexion is better than yesterday," using characters or illustrations to be displayed on the display section 19.

As described above, by comparing with the previous physical condition information or notifying of the difference with the previous physical condition information, it is possible to cause the user to more properly recognize the change in the physical condition of the user.

Although the example in which the determining section 112 calculates the difference in the value of R in order to compare the previous physical condition information with the second physical condition information and notifies of the difference in the value of R has been described, the present invention is not limited thereto.

The determining section 112 may calculate a difference for at least one parameter among R, G, and B or may calculate a difference for biometric information acquired from an image analysis or a biosensor.

Further, the control section 114 may notify the user of the differences.

Further, the previous physical condition information may be physical condition information acquired at a certain past time point but may be an average value of a plurality of pieces of physical condition information acquired at a plurality of past time points.

[Modified Example Using Other Physical Condition Information]

Further, for example, in the above-described embodiment, the physical condition notification process is performed by using the value of R of the face area of the user as the physical condition information.

As a modification thereof, the physical condition notification process may be performed using other physical condition information.

For example, the physical condition information acquiring section 111 may acquire the body temperature of the user by employing an infrared filter or the like for the imaging section 16.

Then, the body temperature of the user may be used as the physical condition information.

[Modified Example in which Notification Method is Different]

Besides, for example, in the above-described embodiment, in a case in which the notification is performed, the selecting section 113 selects the display section 19 at the time of notification of a predetermined message.

Further, the control section 114 performs the notification by causing the message to be displayed on the display section 19.

As a modification thereof, the notification may be performed in other ways.

For example, the selecting section 113 may select a speaker (not illustrated).

Then, the control section 114 may output a voice corresponding to a predetermined message from the speaker.

[Modified Example in which Light Emitting Section is Used for Other Purposes]

Besides, for example, the light emitting section 17 may be used for other purposes.

For example, the light emitting section 17 may be used for the purpose of working on the blood pressure of the user.

In this case, the physical condition information acquiring section 111 acquires blood pressure information of the user, for example, by performing communication with an external blood pressure measuring device.

Then, the control section 114 controls light emission of the light emitting section 17 in accordance with the acquired blood pressure information.

Specifically, in a case in which the acquired blood pressure value is high, the control section 114 controls the light emitting section 17 such that the B component is increased, and blue light is emitted.

It is because there is an effect in that the blood pressure is lowered when the user sees the emission of the blue light.

On the other hand, if the acquired blood pressure value is low, the control section 114 controls the light emitting section 17 such that the R component is increased, and red light is emitted.

It is because there is an effect in that the blood pressure is increased when the user sees the emission of the red light.

[Modified Example Applied to Evaluation for Makeup]

In the above-described embodiment, the notification device 1 notifies the user of the assistance information for improving the acquired physical condition information.

The present invention is not limited thereto, and the notification device 1 may notify the user of other information.

For example, the notification device 1 may notify the user of evaluation information including an evaluation for the makeup instead of the assistance information for improving the physical condition information.

Therefore, in the present modified example, the notification device 1 performs a "makeup notification process" instead of the "physical condition notification process" performed in the above-described embodiment.

A functional configuration and an operation for performing the makeup notification process will be described below with reference to FIGS. 7 and 8.

(Functional Configuration)

Figure 7:
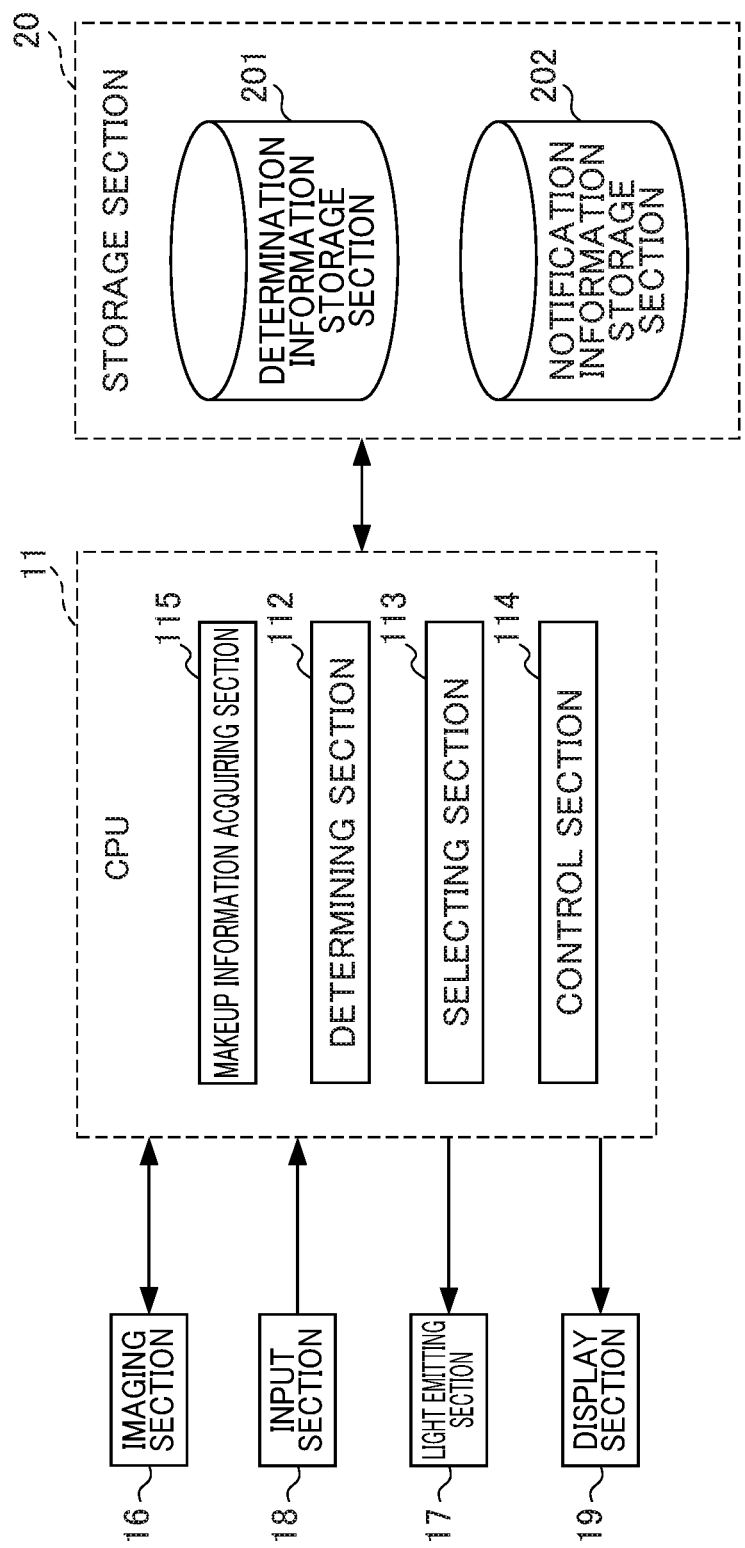
FIG. 7 is a functional block diagram illustrating a functional configuration for executing a makeup notification process in a functional configuration of a notification device.

FIG. 7 is a functional block diagram illustrating a functional configuration for executing the makeup notification process in the functional configuration of the notification device 1.

The makeup notification process includes a series of processing in which the notification device 1 notifies of the evaluation information including the evaluation for the makeup performed on the user.

In a case in which the makeup notification process is executed, the CPU 11 functions as a makeup information acquiring section 115, a determining section 112, a selecting section 113, and a control section 114 as illustrated in FIG. 7.

In the above-described embodiment, the physical condition information acquiring section 111 is replaced with the makeup information acquiring section 115 as compared with the example in which the physical condition notification process is executed.

Further, a determination information storage section 201 and a notification information storage section 202 are set in an area of the storage section 20.

Information for determining makeup information indicating a makeup state through the determining section 112 is stored in the determination information storage section 201.

Specifically, makeup information serving as a determination criterion in the makeup notification process (hereinafter referred to as a "makeup information target value") or makeup information of the user acquired in the makeup notification process (hereinafter referred to as a "makeup information actual measurement value") is stored.

Here, as each piece of makeup information such as the makeup information target value or the makeup information actual measurement value, for example, information indicating a color of each pixel in each area corresponding to a face part (hereinafter referred to as an "evaluation target area") can be used.

For example, an area corresponding to an organ or a part serving as a makeup target such as cheeks, lips, eyes, eyelashes, and a T zone can be set as the evaluation target area.

In this case, a plurality of evaluation target areas may be set or only one evaluation target area may be set in accordance with a setting of the user, makeup content, or the like.

Further, for example, the RGB values for each pixel in these evaluation target areas can be used as the makeup information.

Here, in the above-described embodiment, the value of R indicating the redness of the face of the user among the RGB values for each pixel is used as the physical condition information of the user.

On the other hand, the makeup is performed using cosmetic products corresponding to various colors such as red, yellow, and black in addition to red.

In this regard, as each piece of makeup information such as the makeup information target value or the makeup information actual measurement value, the value of G and the value of B may be used in addition to the value of R.

However, this is only an example, and at least one value among R, G, and B may be used as the makeup information, and other information acquired from image analysis or the like may be further used as makeup information.

The acquisition of each piece of makeup information is performed by the makeup information acquiring section 115 to be described later.

The makeup information acquiring section 115 acquires the makeup information target value by extracting it from an image of a person such as a model as an example.

Alternatively, the makeup information acquiring section 115 acquires the makeup information target value by performing a predetermined process such as a beautiful skin process on the image of the user of the notification device 1 and extracting it from the processed image.

Further, the makeup information acquiring section 115 analyzes the image captured by the imaging section 16 and acquires the makeup information actual measurement value on the basis of an analysis result.

The makeup information acquiring section 115 stores each piece of acquired makeup information in the determination information storage section 201.

The acquisition of the makeup information target value by the makeup information acquiring section 115 may be performed each time the makeup notification process is executed or may be performed before the makeup notification process.

In a case in which the acquisition of the makeup information target value is performed before the makeup notification process, the makeup information target value is stored in the determination information storage section 201 in a form such as a database or the like provided for each user.

Then, the makeup information acquiring section 115 reads and uses the stored makeup information target value each time the makeup notification process is executed.

Information by which the light emitting section 17 or the display section 19 performs a notification under the control of the control section 114 is stored in the notification information storage section 202.

Specifically, control information for controlling the light emission of the light emitting section 17, character data (text data) to be displayed on the display section 19, and image data are stored.

Further, various types of data such as each piece of makeup information or the notification information stored in the determination information storage section 201 or the notification information storage section 202 may be stored only in the storage section 20 but may be appropriately read from the removable medium 100 by the drive 21.

As described in the description of determination information storage section 201, the makeup information acquiring section 115 is a section that acquires each piece of makeup information such as the makeup information target value or the makeup information actual measurement value.

As described above, the makeup information acquiring section 115 acquires the makeup information target value by extracting it from an image of a person such as a model to be a role model.

Further, the makeup information acquiring section 115 analyzes the image captured by the imaging section 16 and acquires the makeup information actual measurement value on the basis of an analysis result.

Here, as described above with reference to FIG. 1, the imaging section 16 is arranged at a position at which the face of the user facing the mirror portion 30 is imaged.

Therefore, the image of the face part of the user captured by the imaging section 16 is analyzed, and the makeup information actual measurement value is acquired on the basis of an analysis result.

Then, the makeup information acquiring section 115 stores each piece of makeup information acquired as described above in the determination information storage section 201 as the determination information.

The determining section 112 is a section that determines whether or not the makeup has been properly performed on the basis of each piece of makeup information stored in the determination information storage section 201.

Here, in the present modified example, the determination is performed using the makeup information actual measurement value measured by the makeup information acquiring section 115 at a first time point (hereinafter referred to as a "first makeup information actual measurement value") and the makeup information actual measurement value measured by the makeup information acquiring section 115 at a second time point after the first time point (hereinafter referred to as a "second makeup information actual measurement value").

To this end, the determining section 112 calculates a difference between the makeup information target value and each piece of makeup information actual measurement value.

Further, the determining section 112 compares the difference between the makeup information target value and the first makeup information actual measurement value (hereinafter referred to as a "first difference") with a difference between the makeup information target value and the second makeup information actual measurement value (hereinafter referred to as a "second difference").

Then, the determining section 112 determines that the makeup information actual measurement value has changed in a case in which the second difference has changed from the first difference.

Accordingly, it is possible to determine a change in the makeup information actual measurement value of the user.

In this case, for example, in a case in which the second difference is smaller than the first difference, the determining section 112 determines that it has changed to be closer to the makeup information target value.

Accordingly, the determining section 112 can determine that the makeup can be performed properly at the second time point as compared with the first time point.

On the other hand, in a case in which the second difference is larger than the first difference, the determining section 112 determines that it has changed to be farther away from the makeup information target value.

Accordingly, the determining section 112 can determine that the makeup has not been performed properly (that is, an inappropriate makeup has been performed) at the second time point as compared with the first time point.

Further, in these cases, for example, the determining section 112 sets a time point before the notification as the first time point and sets a time point after the notification as the second time point and can thus determine the change between before and after the notification in the makeup information actual measurement value of the user.

Further, in the present modified example, the determining section 112 performs determination using the makeup information target value and each piece of makeup information actual measurement value as well.

To this end, the determining section 112 compares the difference between the makeup information target value and each piece of makeup information actual measurement value (for example, the second makeup information actual measurement value which is a most recent actual measurement value) with a predetermined threshold value.

Then, in a case in which the difference between the makeup information target value and the makeup information actual measurement value is smaller than the predetermined threshold value, the determining section 112 determines that a goal in the makeup has been achieved.

Here, in a case in which the difference between the makeup information target value and the makeup information actual measurement value is smaller than the predetermined threshold value, it corresponds to a case in which the user has performed the makeup properly, and thus the makeup close to the goal has been performed.

In a case in which there are a plurality of evaluation target areas, the determining section 112 performs the above-described determination for each of a plurality of evaluation target areas.

The determining section 112 outputs a determination results acquired by each determination to the selecting section 113 or the control section 114 to be described later. Accordingly, the selecting section 113 and the control section 114 to be described later can control the notification on the basis of a result of each determination.

The selecting section 113 is a section that selects a notifying section used for notification in the makeup notification process.

The selecting section 113 selects an appropriate notifying section in accordance with content of the notification or the like decided on the basis of the determination result of the determining section 112.

The control section 114 is a section that executes the notification by controlling the notifying section selected by the selecting section 113 on the basis of the determination result of the determining section 112.

Specific content of the notification executed by cooperation of these units will be described in detail in the following description of [Operation].

(Operation)

Next, an operation of the notification device 1 in the present modified example will be described.

Figure 8:
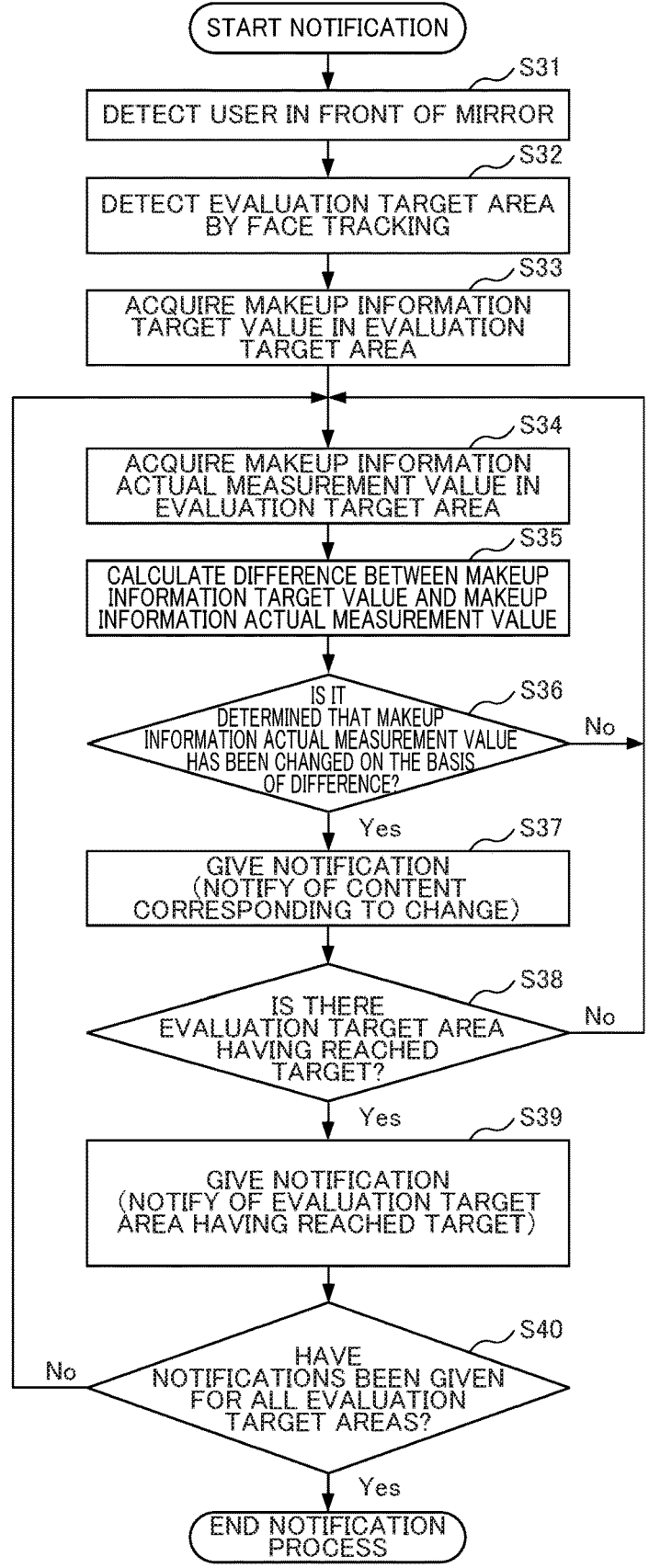
FIG. 8 is a flowchart for describing a flow of a makeup notification process executed by a notification device.

FIG. 8 is a flowchart for describing a flow of the makeup notification process executed by the notification device 1.

The makeup notification process is started, for example, with the activation of the notification device 1.

In step S31, the makeup information acquiring section 115 analyzes an image captured by the imaging section 16, and detects the user facing the mirror portion 30.

In step S32, the makeup information acquiring section 115 detects the evaluation target area by performing face tracking on the user directly facing the mirror portion 30.

The face tracking can be realized by specifying a contour of the user or a feature point of the user (for example, a feature point indicating a position of each organ or the like) by image analysis.

In step S33, the makeup information acquiring section 115 acquires the makeup information target value for each evaluation target area detected in step S32.

In step S34, the makeup information acquiring section 115 acquires the makeup information actual measurement value for each evaluation target area detected in step S32.

In step S35, the determining section 112 calculates the difference between the makeup information target value acquired in step S33 and the makeup information actual measurement value acquired in step S34.

The difference corresponds to the second difference described above.

Further, the difference calculated in step S35 at a time point before step S35 which is currently performed corresponds to the first difference described above.

In step S36, the determining section 112 determines whether or not the makeup information actual measurement value has been changed on the basis of the difference.

Specifically, the determining section 112 compares the first difference with the second difference as described above.

Then, in a case in which the second difference has been changed from the first difference, it is determined that the makeup information actual measurement value has been changed. In this case, as described above, it may be further determined whether or not a change in which the second difference is smaller than the first difference has been performed or whether or not a change in which the second difference is larger than the first difference has been performed.

In a case in which the makeup information actual measurement value has been changed (including both a change in which it has been increased and a change in which it has been decreased), Yes is determined in step S36, and the process proceeds to step S37.

On the other hand, in a case in which the makeup information actual measurement value has not been changed (including both a change in which it has been increased and a change in which it has been decreased) or has not been substantially changed, No is determined in step S36, the process returns to step S34, and the measurement of the makeup information actual measurement value is performed again using the current second difference as a new first difference.

In a case in which the current process is the first process, since there is no first difference, and there is only the second difference calculated this time, in this case, No is determined in step S36, the process returns to step S34, and the measurement of the makeup information actual measurement value is performed again using the current second difference as a new first difference.

In step S37, the selecting section 113 and the control section 114 give a notification to the user in cooperation with each other.

In this notification, for example, the selecting section 113 selects the display section 19 as the notifying section.

Then, the control section 114 gives a notification to the user, for example, by causing contents determined to have been changed in step S37, a message indicating the evaluation target area determined to have been changed, and illustrations to be displayed on the display section 19.

For example, in a case in which the change in which the second difference is smaller than the first difference is performed, the control section 114 may cause a message including an evaluation indicating that the makeup performed on the user is proper such as, for example, "makeup has been performed properly!" to be further displayed on the display section 19.

On the other hand, in a case in which the change in which the second difference is greater than the first difference is performed, the control section 114 may cause a message including an evaluation for the makeup performed on the user such as, for example, "makeup is not performed well!" to be displayed on the display section 19.

Further, the control section 114 may give a notification to the user using, for example, the value of the first difference or the second difference or a change amount of the first difference or the second difference as a makeup achievement value.

For example, these values may be notified to the user as an achievement rate.

In this case, for example, a notification indicating a value having the largest (or smallest) difference with the makeup information target value among the RGB values may be given to the user.

For example, in a case in which the evaluation target area is the lips of the user, and the difference in the value of R is large, a message including an evaluation indicating that the makeup performed on the user is improper or a makeup improvement method such as "Lips are not fully red. Please put on more red lipstick." may be further displayed on the display section 19.

In step S38, the determining section 112 compares the difference (that is, the second difference) between the makeup information target value and the second makeup information actual measurement value calculated in step S35 with a predetermined threshold value, and determines whether or not there is an evaluation target area that has reached the goal (that is, an evaluation target area which has been properly made-up).

In a case in which there is an evaluation target area which has reached the goal, Yes is determined in step S38, and the process proceeds to step S39.

On the other hand, in a case in which there is no evaluation target area which has reached the goal, No is determined in step S38, the process returns to step S34, and the measurement of the makeup information actual measurement value is performed again using the current second difference as a new first difference.

In step S39, the selecting section 113 and the control section 114 give a notification to the user in cooperation with each other.

In this notification, for example, the selecting section 113 selects the display section 19 as the notifying section.

Then, for example, the control section 114 gives a notification to the user by causing a message indicating the evaluation target area determined as reaching the goal in step S38, or illustrations to be displayed on the display section 19.

In this case, the message including the evaluation for the makeup performed on the user such as "makeup has been performed properly!" may be further displayed on the display section 19.

In step S40, the determining section 112 determines whether or not the notification of step S39 has been performed for all the evaluation target areas (that is, whether or not all the evaluation target areas have reached the goal).

In a case in which the notification of step S39 is performed for all the evaluation target areas, Yes is determined in step S40, and the process ends.

On the other hand, in a case in which there is any one evaluation target area for which the notification of step S39 is not performed, No is determined in step S40, the process returns to step S34, and the measurement of makeup information actual measurement value is performed again using the current second difference as a new first difference.

With the makeup notification process described above, the notification device 1 can notify of the evaluation information including the evaluation for the makeup performed on the user.

Therefore, the user can understand whether or not the makeup performed on the user is appropriate.

In the makeup notification process described above, as the evaluation information including the evaluation for the makeup performed on the user, a notification indicating whether or not the goal has been reached and a notification indicating the evaluation target area which has reached the goal are given.

The present invention is not limited thereto, and a stepwise evaluation may be performed, and a stepwise gradual evaluation result may be given.

For example, a plurality of predetermined threshold values may be set stepwise, and a notification of different content may be given each time the difference between the makeup information target value and the makeup information actual measurement value is a certain threshold value or less.

In this case, for example, a first threshold value and a second threshold value smaller than the first threshold value are set.

Then, the makeup is started, and then at a time point at which the difference between the makeup information target value and the makeup information actual measurement value is the first threshold value or less, a notification indicating a message such as "Goal will be reached soon!" is performed.

Further, the makeup is continued, and then at a time point at which the difference between the makeup information target value and the makeup information actual measurement value is the second threshold value or less, a notification indicating a message such as "Goal has been reached" is performed.

Accordingly, the notification of the evaluation information including the stepwise evaluation can be given to user.

Further, such stepwise notification may be performed for each of a plurality of evaluation target areas.

Further, the number of steps may be more than two.

In the makeup notification process described above, in a case in which there is no change between the first difference and the second difference, No is determined in step S36, but the notification related to the determination is not performed particularly.

The present invention is not limited thereto, and for example, a message such as "There is no change in makeup state. Please make up designated part." may be performed.

Further, in a case in which there is no change between the first difference and the second difference during the lapse of a predetermined period of time, and the determination of No is continued in step S36, the makeup notification process may end.

Further, in the makeup notification process described above, in step S36, it is determined whether or not the makeup information actual measurement value has been changed by comparing the first difference with the second difference.

The present invention is not limited thereto, and it may be determined whether or not the makeup information actual measurement value has been changed by comparing the first makeup information actual measurement value with the second makeup information actual measurement value.

Further, in this case, it may be determined whether or not the makeup has been performed properly at the second time point as compared with the first time point by comparing how the second makeup information actual measurement value has been changed from the first makeup information actual measurement value (for example, whether or not the RGB values have been increased or decreased) with the makeup information target value.

Further, in the makeup notification process described above, in step S38, it is determined whether or not there is an evaluation target area which has reached the goal (that is, an evaluation target area which has been properly performed) by comparing the difference (that, the second difference) between the makeup information target value and the second makeup information actual measurement value with a predetermined threshold value.

The present invention is not limited thereto, and it may be determined whether or not there is an evaluation target area which has reached the goal by comparing the second makeup information actual measurement value with a predetermined threshold value.

In other words, in the makeup notification process, the determination may be performed without calculating the difference of each piece of makeup information target value.

Further, the method of acquiring the makeup information target value may be different.

In this case, for example, the notification device 1 performs a virtual makeup (hereinafter referred to as a "virtual makeup") before the makeup notification process described above.

In the virtual makeup, the image of the user captured in the imaging section 16 and the color corresponding to the virtual cosmetic product are displayed on the display section 19 in a superimposed manner.

Further, the makeup state by a virtual cosmetic product is made different on the basis of a manipulation of the user.

For example, in a case in which the virtual cosmetic product is a virtual cheek, a position and a shape at which the cheek is put are made different in accordance with a manipulation of the user.

Alternatively, each area of the face of the user is detected, and a position and a shape at which the cheek is put are automatically adjusted to a position and a shape of each detected area of the face of the user.

Accordingly, it is possible to perform an appropriate virtual makeup which the user desires to achieve.

Then, in the appropriate virtual makeup, RGB values of a makeup part or a shape of the makeup part is acquired as the makeup information target value.

Then, by actually performing the makeup in the above-described makeup notification process, it is possible to evaluate an actual makeup using the makeup information target value acquired by the virtual makeup.

Accordingly, it is possible to acquire the makeup information target value using the face of the user as an example without actually performing the makeup using various cosmetic products (that is, just by performing a virtual makeup).

Here, the present invention is not limited thereto, and a face which is actually made-up by an expert such as a beauty expert in front of a store of a cosmetic product dealer or the like may be imaged by the imaging section 16, and the makeup information target value may be acquired from the image.

Accordingly, it is possible to acquire the makeup information target value using the face of the user which is made-up by an expert as a role model.

Further, in a case in which the makeup information target value using the face of the user as a role model is acquired as described above, the makeup information target value may be displayed very thinly in the makeup notification process described above.

For example, the makeup information target value may be displayed with a high transmittance (for example, a transmittance of 90 to 95%), or a border of a shape corresponding to a makeup information target value, a makeup role model image or the like may be displayed.

In this case, in the makeup notification process described above, the user can perform the makeup with reference to a specific goal (role model).

Accordingly, the makeup information target value can be used not only for evaluating the makeup but also for improving the convenience of the makeup by the user.

Further, the present modified examples and the above-described embodiment may be combined.

In other words, the physical condition notification process and the makeup notification process may be selectively performed in accordance with a selection manipulation of the user, a setting, or the like.

[Modified Example of Physical Condition Notification Process]

The physical condition notification process described above with reference to the flowchart of FIG. 5 is an example, and the present invention is not limited thereto.

For example, in step S16, the determining section 112 compares the first physical condition information with the second physical condition information, and determines whether or not the physical condition information has been improved on the basis of a comparison result.

As a modification of the process, in step S16, the determining section 112 may compare the difference between the reference physical condition information and the first physical condition information and the difference between the reference physical condition information and the second physical condition information.

Then, it may be determined how the physical condition information has been changed on the basis of a comparison result of the differences.

Specifically, if the difference between the second physical condition information and the reference physical condition information has been decreased from the difference between the first physical condition information and the reference physical condition information, it may be determined that the physical condition has been improved, and Yes may be determined in step S16, whereas if the difference between the second physical condition information and the reference physical condition information has been increased or changed from the difference between the first physical condition information and the reference physical condition information, it may be determined that the physical condition has not been improved, and No may be determined in step S16.

Then, in step S17, the selecting section 113 and the control section 114 may give a notification indicating that the physical condition information has been improved by the makeup to the user in cooperation with each other.

Further, after the notification in step S17, it may be determined whether or not there is an evaluation target area in which the state at the current time point reaches the goal (that is, an evaluation target area showing that the physical condition has been reliably improved) by comparing the difference between the second physical condition information and the reference physical condition information with a predetermined threshold value.

Further, in a case in which it is determined that the status at the current time point has reached the goal in this determination, the notification indicating that the status at the current time point has reached the goal may be performed, and then the present physical condition notification process may end.

With this modification described above, it is possible to continue the physical condition notification process until the physical condition information of user is improved by the makeup.

Similarly, also in step S20, the determining section 112 may compare the reference physical condition information and the second physical condition information.

In this case, the difference between the reference physical condition information and the first physical condition information may be compared with the difference between the reference physical condition information and the second physical condition information.

Then, it may be determined how the physical condition information has been changed on the basis of a comparison result of the differences.

Specifically, if the difference between the second physical condition information and the reference physical condition information has been decreased from the difference between the first physical condition information and the reference physical condition information, it may be determined that the physical condition has been improved, and Yes may be determined in step S20, whereas if the difference between the second physical condition information and the reference physical condition information has been increased or not changed from the difference between the first physical condition information and the reference physical condition information, it may be determined that the physical condition has not been improved, and No may be determined in step S20.

In step S21, the selecting section 113 and the control section 114 may give a notification indicating that the physical condition information has been improved by the massage to the user in cooperation with each other.

Further, after the notification in step S21, it may be determined whether or not there is an evaluation target area in which the state at the current time point reaches the goal (that is, an evaluation target area showing that the physical condition has been reliably improved) by comparing the difference between the second physical condition information and the reference physical condition information with a predetermined threshold value.

Further, in a case in which it is determined that the status at the current time point has reached the goal in this determination, the notification indicating that the status at the current time point has reached the goal may be performed, and then the present physical condition notification process may end.

With this modification described above, it is possible to continue the physical condition notification process until the physical condition information of user is improved by the massage.

As another modified example, step S12 and step S13 may be omitted.

In other words, the processing after step S14 may be performed without comparing the reference physical condition information with the first physical condition information.

With this modification described above, for example, it is possible to perform the physical condition notification process in order to further improve the physical condition information of the user even when the physical condition of the user is good.

As another modified example, a setting indicating that the makeup mode is performed may be performed in accordance with a manipulation of the user or the like so that steps S18 to S22 are not performed.

In other words, the care mode may not be performed.

In this case, steps S12 to S15 may be omitted, and step S16 and step S17 may be changed as follows.

In other words, a modification may be made such that it is determined in step S16 whether or not the physical condition information has been improved, a notification of the assistance information or the evaluation information based on the result in step S17 is performed, and then the process return to step S16.

As another modified example, by setting in advance the fact that the care mode is performed in accordance with the manipulation or the like of the user, steps S15 to S17 may not be performed.

In other words, makeup mode may not be performed.

In this case, while step S18 to step S19 are omitted, step S20 and step S21 may be changed as follows.

In other words, a modification may be made such that, in step S20, it is determined whether or not the physical condition information has been improved, and in step S21 or step S22, the notification of the assistance information or the evaluation information based on the result is performed, and then the process returns to step S20.

In the above-described physical condition notification process, the determination using the physical condition information of the user (for example, the value of R indicating the redness of the face of the user) is performed in the determination of step S12, step S16, and step S20.

In other words, it is determined whether or not the physical condition of the user has been improved.

The present invention is not limited thereto, and determination using the makeup information of the user (for example, the RGB values indicating the makeup state using cosmetic products of various colors) may be performed in the determination of step S12, step S16, and step S20.

In other words, it may be determined whether or not the makeup of the user has been properly performed.

In this case, as described above, a setting indicating that the makeup mode is performed may be performed in accordance with a manipulation of the user or the like so that steps S18 to S22 are not performed.

In other words, the care mode may not be performed.

As [Modified example of physical condition notification process], various examples have been described above, but the physical condition notification process described above may be partly modified (including omission or replacement) within the scope not departing from the gist of the above-described embodiment, and parts of the physical condition notification process and the makeup notification process may be properly combined.

[Modified Example of Makeup Notification Process]

The makeup notification process described above with reference to the flowchart of FIG. 8 is an example, and the present invention is not limited thereto.

For example, after step S35 which is initially performed, the determining section 112 additionally performs a process of comparing the difference (that is, the first difference) between the makeup information actual measurement value and the makeup information target value calculated in step S35 with a predetermined a threshold value.

Then, in a case in which the first difference is smaller than the predetermined threshold value, and it is determined that each evaluation target area has already reached the goal, the makeup notification process may end without performing step S36 and subsequent steps.

Alternatively, only the notification in step S39 may be performed, and then the makeup notification process may end.

Further, in a case in which the first difference is larger than the predetermined threshold value, and it is determined that each evaluation target area has not reached the goal, step S36 and subsequent steps are performed, but the process of comparing of the first difference with the predetermined threshold value may not be performed again as a subsequent flow.

With this modification described above, it is possible to omit the processes such as the calculation of the second difference and the comparison between the first difference and the second difference which are originally unnecessary in a case in which the makeup is performed properly.

Further, the makeup information target value which is the target used for determining whether or not the process of step S36 and subsequent steps is performed may be a target value decided on the basis of the makeup information actual measurement value of the face of the user which has been regarded as achieving the goal in the past.

As another modified example, step S38, step S39, and step S40 may be omitted.

In this case, instead of step S38, the determining section 112 adds a process of determining whether or not a predetermined period of time has elapsed after the makeup notification process is started.

Then, the process of step S34 to step S37 is repeated until the predetermined period of time elapses.

Further, in a case in which the predetermined period of time has elapsed, the selecting section 113 and the control section 114 give a notification in cooperation with each other.

In this notification, if there is an evaluation target area which has achieved the goal, the presence of the evaluation target area is given.

On the other hand, if there is an evaluation target area that has not achieved the goal, the presence of the evaluation target area is given.

In this case, the value of the difference (that is, the second difference) between the makeup information target value and the second makeup information actual measurement value, for the evaluation target area which has not achieved the goal, may be given as the makeup achievement value.

With this modification described above, it is possible to decide a period of time for the makeup notification process in advance.

Then, it is possible to perform a notification indicating whether or not a proper makeup has been performed within the period of time.

Further, in a case in which a proper makeup has not been performed, it is possible to notify of the makeup achievement value.

In the makeup notification process described above, the determination using the makeup information of the user (for example, the RGB values indicating the makeup state using cosmetic products of various colors) is performed in the determination of step S36 and step S38.

In other words, it is determined whether or not the makeup of the user has been performed properly.

Alternatively, determination using the physical condition information of the user (for example, the value of R indicating the redness of the face of the user) may be performed in the determination of step S36 and step S38.

In other words, it may be determined whether or not the physical condition of the user has been improved.

As [Modified example of makeup notification process], various examples have been described above, but the makeup notification process described above may be partly modified (including omission or replacement) within the scope not departing from the gist of the above-described embodiment, and parts of the physical condition notification process and the makeup notification process may be properly combined.

[Other Modified Examples]

Further, in the above-described embodiment, the notification device 1 to which the present invention is applied has been described using a portable self-standing mirror as an example, but the present invention is not particularly limited thereto.

For example, the present invention can be applied to an electronic device incorporated into a large mirror such as a full-length mirror, an electronic device incorporated into a stationary bathroom vanity, and a mirror-shaped electronic device installed in a bathroom.

The processing sequence described above can be executed by hardware, and can also be executed by software.

In other words, the hardware configuration of FIGS. 4 and 7 is merely an illustrative example, and the present invention is not particularly limited thereto. More specifically, the types of functional blocks employed to realize the above-described functions are not particularly limited to the examples shown in FIGS. 4 and 7, so long as the analysis system S can be provided with the functions enabling the aforementioned processing sequence to be executed in its entirety.

A single functional block may be configured by a single piece of hardware, a single installation of software, or a combination thereof.

The functional configurations of the present embodiment are realized by a processor executing arithmetic processing, and processors that can be used for the present embodiment include a unit configured by a single unit of a variety of single processing devices such as a single processor, multi-processor, multi-core processor, etc., and a unit in which the variety of processing devices are combined with a processing circuit such as ASIC (Application Specific Integrated Circuit) or FPGA (Field-Programmable Gate Array).

In the case of having the series of processing executed by software, the program constituting this software is installed from a network or recording medium to a computer or the like.

The computer may be a computer equipped with dedicated hardware. In addition, the computer may be a computer capable of executing various functions, e.g., a general purpose personal computer, by installing various programs.

The storage medium containing such a program can not only be constituted by the removable medium 100 of FIG. 2 distributed separately from the device main body for supplying the program to a user, but also can be constituted by a storage medium or the like supplied to the user in a state incorporated in the device main body in advance. The removable medium 100 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, the ROM 112 and 212 of FIGS. 3 and 4 in which the program is recorded or a hard disk, etc. included in the storage unit 119 and 220 of FIGS. 3 and 4.

It should be noted that, in the present specification, the steps defining the program recorded in the storage medium include not only the processing executed in a time series following this order, but also processing executed in parallel or individually, which is not necessarily executed in a time series.

Further, in the present specification, the terminology of the system means an entire apparatus including a plurality of apparatuses and a plurality of units.

The embodiments of the present invention described above are only illustrative, and are not to limit the technical scope of the present invention. The present invention can assume various other embodiments. Additionally, it is possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

What is claimed is:

1. A notification device comprising:
    a memory; and
    a processor,
    wherein the processor executes a program stored in the memory to perform operations comprising:
        acquiring face information;
        performing a notification, the performing the notification comprising controlling emission colors of a light emitting section based on complexion information included in the face information such that physical condition information determined from the face information is emphasized; and
        when a difference between (i) the complexion information included in the face information at a time of performing the notification and (ii) the complexion information after the physical condition information changes due to a predetermined treatment performed on a face corresponding to the face information after performing the notification, is at least a predetermined value, controlling to change the emission colors of the light emitting section to be different from the emission colors of the light emitting section before the predetermined treatment is performed.

2. The notification device according to claim 1, further comprising an output device,
    wherein the processor is further configured to control the output device to output information for encouraging a predetermined action corresponding to the face information at one of the time of performing the notification and a time after performing the second notification.

3. The notification device according to claim 1, wherein the processor is further configured to:
    acquire an image of a subject which is an acquisition target from the face corresponding to the face information, and
    acquire the complexion information, which comprises information on a complexion of the face of the subject, based on the image of the subject.

4. The notification device according to claim 2, wherein the output device comprises a display section, and
    wherein the processor is further configured to control the display section to output the information for encouraging the predetermined action.

5. The notification device according to claim 2, wherein the output device comprises a display section, and
    wherein the processor is further configured to:
        perform the notification by display of characters, and
        control a display position of the characters on the display section.

6. The notification device according to claim 1, further comprising a display section,
    wherein the processor is further configured to display a subject, which is an acquisition target from the face corresponding to the face information, on the display section.

7. The notification device according to claim 1, wherein the processor is further configured to notify of assistance information or evaluation information based on the face information.

8. A notification method executed by a notification device under control of a program stored in a memory and executed by a processor of the notification device, the notification method comprising:
    acquiring face information;
    performing a notification, the performing the notification comprising controlling emission colors of a light emitting section based on complexion information included in the face information such that physical condition information determined from the face information is emphasized; and
    when a difference between (i) the complexion information included in the face information at a time of performing the notification and (ii) the complexion information after the physical condition information changes due to a predetermined treatment performed on a face corresponding to the face information after performing the notification, is at least a predetermined value, controlling to change the emission colors of the light emitting section to be different from the emission colors of the light emitting section before the predetermined treatment is performed.

9. The notification method according to claim 8, the notification device further having an output device, and the method further comprising controlling the output device to output information for encouraging a predetermined action corresponding to the face information at one of the time of performing the notification and a time after performing the notification.

10. The notification method according to claim 8, further comprising:
    acquiring an image of a subject which is an acquisition target from the face corresponding to the face information, and
    acquire the complexion information, which comprises information on a complexion of the face of the subject, based on the image of the subject.

11. A non-transitory computer-readable storage medium storing a program that is executable by a computer that comprises a processor to control a notification device, the program being executable to control the computer to perform operations comprising:
  acquiring face information;
  performing a notification, the performing the notification comprising controlling emission colors of a light emitting section based on complexion information included in the face information such that physical condition information determined from the face information is emphasized; and
  when a difference between (i) the complexion information included in the face information at a time of performing the notification and (ii) the complexion information after the physical condition information changes due to a predetermined treatment performed on a face corresponding to the face information after performing the notification, is at least a predetermined value, controlling to change the emission colors of the light emitting section to be different from the emission colors of the light emitting section before the predetermined treatment is performed.

* * * * *

UNITED STATES PATENT AND TRADEMARK OFFICE
CERTIFICATE OF CORRECTION

| | |
|---|---|
| PATENT NO. | : 11,191,341 B2 |
| APPLICATION NO. | : 16/242593 |
| DATED | : December 7, 2021 |
| INVENTOR(S) | : Natsumi Hamaoka |

It is certified that error appears in the above-identified patent and that said Letters Patent is hereby corrected as shown below:

In the Claims

Column 31, Line 62 (Claim 2, Line 7), delete "second".

Signed and Sealed this
Nineteenth Day of July, 2022

Katherine Kelly Vidal
*Director of the United States Patent and Trademark Office*